(12) United States Patent
Gabler (10) Patent No.: US 10,703,326 B2
(45) Date of Patent: Jul. 7, 2020

(54) HOOD HINGE FOR A FRONT HOOD OF A VEHICLE HAVING MOVABLE SUPPORT OF A LIFTING ACTUATOR

(71) Applicant: Audi AG, Ingolstadt (DE)

(72) Inventor: Ivo Gabler, Gaimersheim (DE)

(73) Assignee: Audi AG, Ingolstadt (DE)

( * ) Notice: Subject to any disclaimer, the term of this patent is extended or adjusted under 35 U.S.C. 154(b) by 213 days.

(21) Appl. No.: 16/080,265

(22) PCT Filed: Dec. 8, 2016

(86) PCT No.: PCT/EP2016/002069
§ 371 (c)(1),
(2) Date: Aug. 27, 2018

(87) PCT Pub. No.: WO2017/148494
PCT Pub. Date: Sep. 8, 2017

(65) Prior Publication Data
US 2019/0061679 A1 Feb. 28, 2019

(30) Foreign Application Priority Data
Mar. 1, 2016 (DE) .................. 10 2016 002 523

(51) Int. Cl.
*B60R 21/38* (2011.01)
*B62D 25/12* (2006.01)
*E05D 3/14* (2006.01)

(52) U.S. Cl.
CPC .............. *B60R 21/38* (2013.01); *B62D 25/12* (2013.01); *E05D 3/145* (2013.01);
(Continued)

(58) Field of Classification Search
CPC ..................................................... B60R 21/38
See application file for complete search history.

(56) References Cited

U.S. PATENT DOCUMENTS 8,484,804 B2 * 7/2013 Mehta ................. B60R 21/38
16/368
2015/0167369 A1 * 6/2015 Hwang ................ E05D 3/16
16/233
(Continued)

FOREIGN PATENT DOCUMENTS

DE 101 11 146 3/2002
DE 101 36 340 3/2002
(Continued)

OTHER PUBLICATIONS

International Search Report issued by the European Patent Office in International Application PCT/EP2016/002069.

*Primary Examiner* — James A English
(74) *Attorney, Agent, or Firm* — Henry M. Feiereisen LLC (57) ABSTRACT

A hood hinge for a front hood of a vehicle includes a hinge lower part for attachment to a vehicle body, a hinge upper part for attachment to the front hood, and first and second link levers to connect the hinge lower part to the hinge upper part. A lifting actuator is connected to the hinge lower part via a bearing element and undergoes a change in length in relation to the bearing element between a passive state and an activated active state to raise the hinge upper part. A release device is operatively connected to the bearing element for releasing the telescoping function of the first link lever. The release device is actuated when the bearing element moves from a rest position to an active position.

11 Claims, 6 Drawing Sheets

(52) U.S. Cl.
    CPC ... *E05Y 2201/624* (2013.01); *E05Y 2201/682* (2013.01); *E05Y 2800/746* (2013.01)

(56) References Cited

U.S. PATENT DOCUMENTS

| | | | | |
|---|---|---|---|---|
| 2017/0327074 A1* | 11/2017 | Schabenberger | ...... | B62D 25/12 |
| 2017/0349137 A1* | 12/2017 | Schaurer | ................ | B60R 21/38 |
| 2018/0022311 A1* | 1/2018 | Czechtizky | ............ | B60R 21/38 |
| | | | | 16/231 |

FOREIGN PATENT DOCUMENTS

| | | | | |
|---|---|---|---|---|
| DE | 100 55 828 | | 5/2002 | |
| DE | 103 23 118 | | 12/2004 | |
| DE | 102009040398 | | 3/2011 | |
| DE | 102009040413 | | 3/2011 | |
| DE | 102014015998 | | 5/2016 | |
| DE | 102015003186 B3 * | 6/2016 | ............. | B60R 21/38 |
| DE | 102016002522 B3 * | 3/2017 | ............. | E05D 3/145 |
| EP | 2364886 A1 * | 9/2011 | ............. | B60R 21/38 |

* cited by examiner

HOOD HINGE FOR A FRONT HOOD OF A VEHICLE HAVING MOVABLE SUPPORT OF A LIFTING ACTUATOR

CROSS-REFERENCES TO RELATED APPLICATIONS

This application is the U.S. National Stage of International Application No. PCT/EP2016/002069, filed Dec. 8, 2016, which designated the United States and has been published as International Publication No. WO 2017/148494 and which claims the priority of German Patent Application, Serial No. 102016002523.9, filed Mar. 1, 2016, pursuant to 35 U.S.C. 119(a)-(d).

BACKGROUND OF THE INVENTION

The invention relates to a hood hinge for a front hood of a vehicle with a lifting actuator which raises the front hood in the event of an imminent collision with a pedestrian for reasons of pedestrian protection to thereby reduce the kinetic energy of a pedestrian colliding with the front hood.

DE 10 2009 040 398 A1 discloses a hood hinge for a vehicle hood with pedestrian protection and includes a hinge lower part for attachment to a vehicle body and a hinge upper part for attachment to the vehicle hood and link lever for connection of the hinge lower part with the hinge upper part, with a lifting actuator being movably mounted to the hinge hood for lifting the hinge upper part and prevented by a releasable fixing element in its movement relative to the hinge. This fixing element separates from the lifting actuator, when the hood hinge is compressed beyond its rest position. In the event of an active impact, in which the lifting actuator is triggered, the fixing element fixes the lifting actuator, so that a stroke of the lifting actuator can be used to lift the vehicle hood. In the event of a passive impact, in which the lifting actuator is not triggered, but the hinge is compressed, the fixing element separates from the lifting actuator which is no longer prevented in its displacement and thus can yield in response to the force exerted by the impact and dive down accordingly. Thus, the lifting actuator can no longer hinder the deformation path of the vehicle hood.

Following an active impact which triggers the displacement actuator and causes the engine hood to be raised, the driver can continue driving only with limited visibility. DE 10 2009 040 413 A1 proposes therefore to provide for a hood hinge for a vehicle hood with pedestrian protection and a displacement actuator a connecting device, with which a detachable and re-connectable coupling can be realized between an upper hinge upper part and a lower hinge upper part, so that the engine hood after being lifted can move back to its original position and can be fixed in this position by this connecting device.

It is an object of the invention to provide a hood hinge for a front hood of a vehicle with a lifting actuator which hood hinge is improved over the prior art.

SUMMARY OF THE INVENTION

The object is achieved by a hood hinge with the features of claim 1.

According to the invention, a hood hinge for a front hood of a vehicle is realized, with
 a hinge lower part for attachment to a vehicle body,
 a hinge upper part for attachment to the front hood,
 first and second link levers connecting the hinge lower part to the hinge upper part, with the first link lever being telescopic and its telescopic function being lockable,
 a lifting actuator, which is connected to the lower hinge part by a bearing element which is movably mounted in the hinge lower part and undergoes between a passive state and an activated active state a change in length to cause a lifting of the hinge upper part, with the bearing element assuming a rest position in the passive state of lifting actuator and with the bearing element being moved to an active position as the lifting actuator is activated, and
 a release device operatively connected to the bearing element for releasing the telescopic function of the first link lever, with the release device being actuated when the bearing element is moved from the rest position to the active position.

This hood hinge according to the invention is characterized by a simple structural design, since the adjustment of the front hood of a vehicle to a pedestrian protection position is implemented via the released telescopic function of the first link lever while the telescopic function is locked for normal lifting of the front hood. The adjustment of the front hood to the pedestrian protection position is implemented by means of an activated lifting actuator, which on one hand causes a lifting of the hinge upper part relative to the hinge lower part, and on the other hand a release of the telescopic function of the first link lever via the floating support of the lifting actuator in the lower hinge part by means of a movable bearing element. This eliminates the need for a complicated mechanism for releasing the telescopic function of the first link lever.

According to a configuration of the invention, the hinge lower part has an oblong hole in which the bearing element is movably mounted between the rest position and the active position, with the bearing element being preferably spring-biased by a spring element in the rest position.

In a structurally simple manner, provision is made for a locking element for locking the telescopic function of the first link lever. Furthermore, the release device is preferably configured as a release lever which is swingably arranged in the hinge lower part and pivotally connected to the bearing element and which is coupled to the locking element in such a manner that the locking element is actuated for releasing the telescopic function of the first link lever when the bearing element moves from the rest position to the active position.

A further preferred refinement of the invention provides for the locking element to be configured as a locking lever, which is swingably mounted in the hinge lower part for locking the telescopic function of the first link lever and which is coupled with the release lever for releasing the telescopic function of the first link lever.

To realize the floating support of the lifting actuator, according to a configuration of the invention, the lifting actuator is movably mounted in an actuator holder, with the actuator holder being arranged on the hinge lower part. This ensures that the lifting actuator, when actuated, is able to move in opposite direction of the change in length in relation to the actuator holder.

According to an advantageous configuration of the invention, the lifting actuator is formed of an actuator housing with an actuator tappet which can move out from the actuator housing in the active state, with the actuator housing of the lifting actuator preferably being connected to the bearing element. It is particularly advantageous when such a lifting actuator is designed as a pyrotechnic actuator.

A particularly advantageous configuration of the invention provides that the hinge upper part is constructed of a lower hinge upper part and an upper hinge upper part which is swingably connected to the lower hinge upper part, and a further locking element is provided for locking the swinging movement between the upper and lower hinge upper parts, with the further locking element being actuated for releasing the swinging movement between the hinge lower part and the hinge upper part, as the lifting actuator changes in length.

BRIEF DESCRIPTION OF THE DRAWING

An exemplary embodiment of the invention will now be described in detail with reference to the attached figures. It is shown in.

Figure 1:
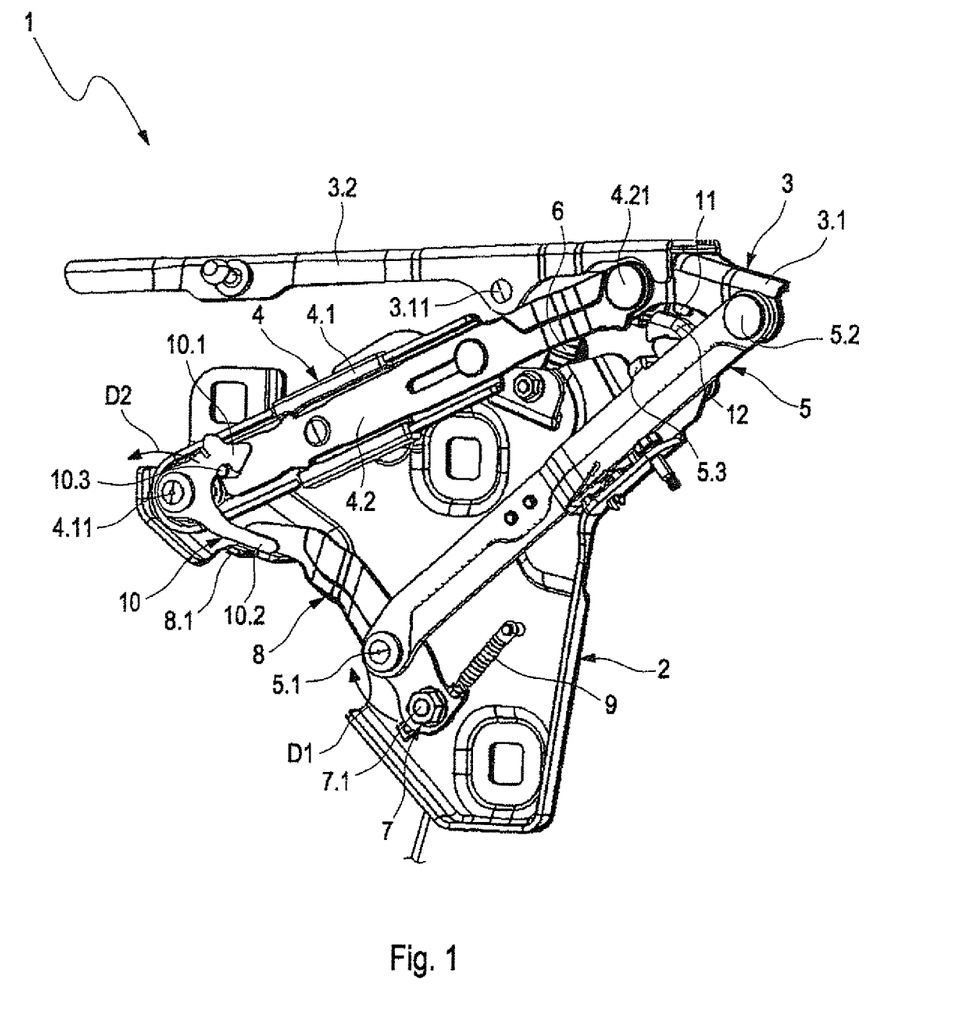
FIG. 1 a schematic and perspective illustration of a hood hinge of a vehicle with a view upon a first and second link lever according to the invention, FIG. 2 a schematic and perspective illustration of the hood hinge according to FIG. 1 with a view upon a lifting actuator, FIG. 3 a schematic illustration of the hood hinge according to FIG. 1 in the opened state, FIG. 4 a schematic illustration of the hood hinge according to FIG. 1 in a pedestrian protection position with a view upon the first and second link levers, FIG. 5 a schematic illustration of the hood hinge according to FIG. 4 with a view upon the activated lifting actuator, FIG. 6 a detailed schematic illustration of the holder of the lifting actuator on the hinge lower part of the hood hinge, and FIG. 7 a detailed schematic and perspective illustration of the floating support of the lifting actuator on the hinge lower part of the hood hinge.
Figure 2:
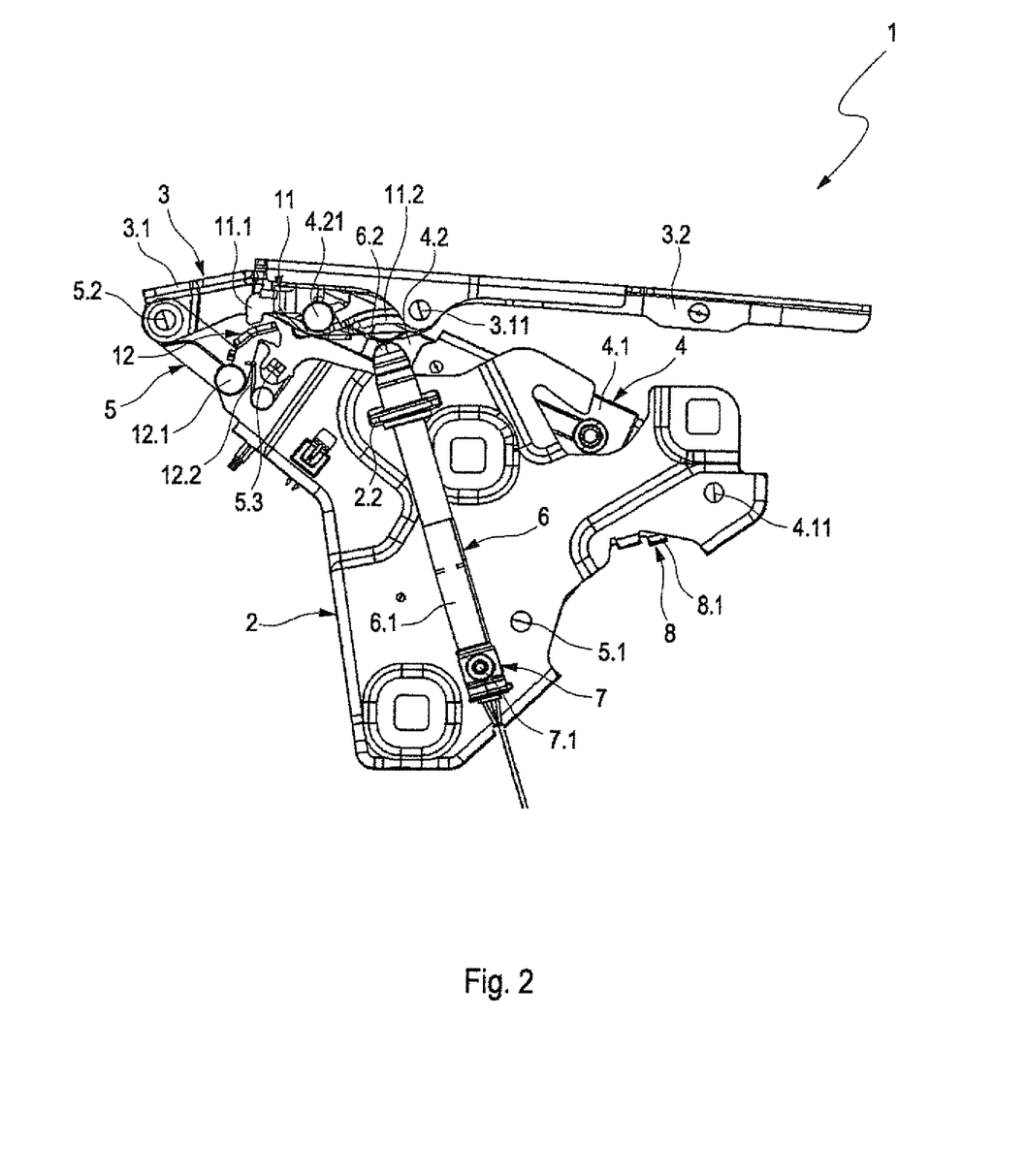

FIGS. 1 and 2 show a hood hinge 1 for a front hood (not shown) of a vehicle, which is constructed with a hinge lower part 2 as a hinge base plate connected to a vehicle body of the vehicle, and a hinge upper part 3 swingably connected to the hinge lower part via a first link lever 4 and a second link lever 5. The hinge upper part 3 includes a lower hinge upper part 3.1, to which the first link lever 4 and the second link lever 5 are attached, and an upper hinge upper part 3.2 which is pivotally connected to the hinge lower upper part 3.2 and is connected to the front hood.

DETAILED DESCRIPTION OF PREFERRED EMBODIMENTS

FIG. 1 shows the one side of the hood hinge 1 with a view upon the first and the second link levers 4 and 5, and FIG. 2 shows the opposite side with a view upon a pyrotechnically triggering lifting actuator 6. The activation of this lifting actuator 6 leads to the lifting of the hinge upper part 3, thereby shifting the front hood to a pedestrian protection position.

The first link lever 4 is configured telescopically by means of a first sublever 4.1 and a second sublever 4.2. For this purpose, the first sublever 4.1 is configured as a guide rail with a U-shaped cross section, in which the second sublever 4.2 is guided. The telescopic connection of the two sublevers 4.1 and 4.2 is realized via oblong holes and guide pins which are provided in both parts, respectively, wherein a guide pin of one sublever alternately engages in an oblong hole of the other sublever. The first sublever 4.1 is swingably mounted in the hinge lower part 2 at one end via a pivot axis 4.11 together with a locking element 10, while the second sublever 4.2 is swingable by swingably connected via a further pivot axis 4.21 with the hinge lower upper part 3.1.

The second link lever 5 is swingably mounted in the lower hinge part 2 via a pivot axis 5.1 at one end together with a release lever 8 as release device, while the other end of this second link lever 5 is swingable by being pivotally connected via a further pivot axis 5.2 to the lower hinge upper part 3.1. The lower hinge upper part 3.1 has a further pivot axis 3.11, which realizes a pivotal connection with the upper hinge upper part 3.2. This pivotal connection is locked by means of a further locking element 1 and is released by the activated lifting actuator 6 only in order to raise the hinge upper part 3 to a position which corresponds to the pedestrian protection position of the front hood.

Figure 3:
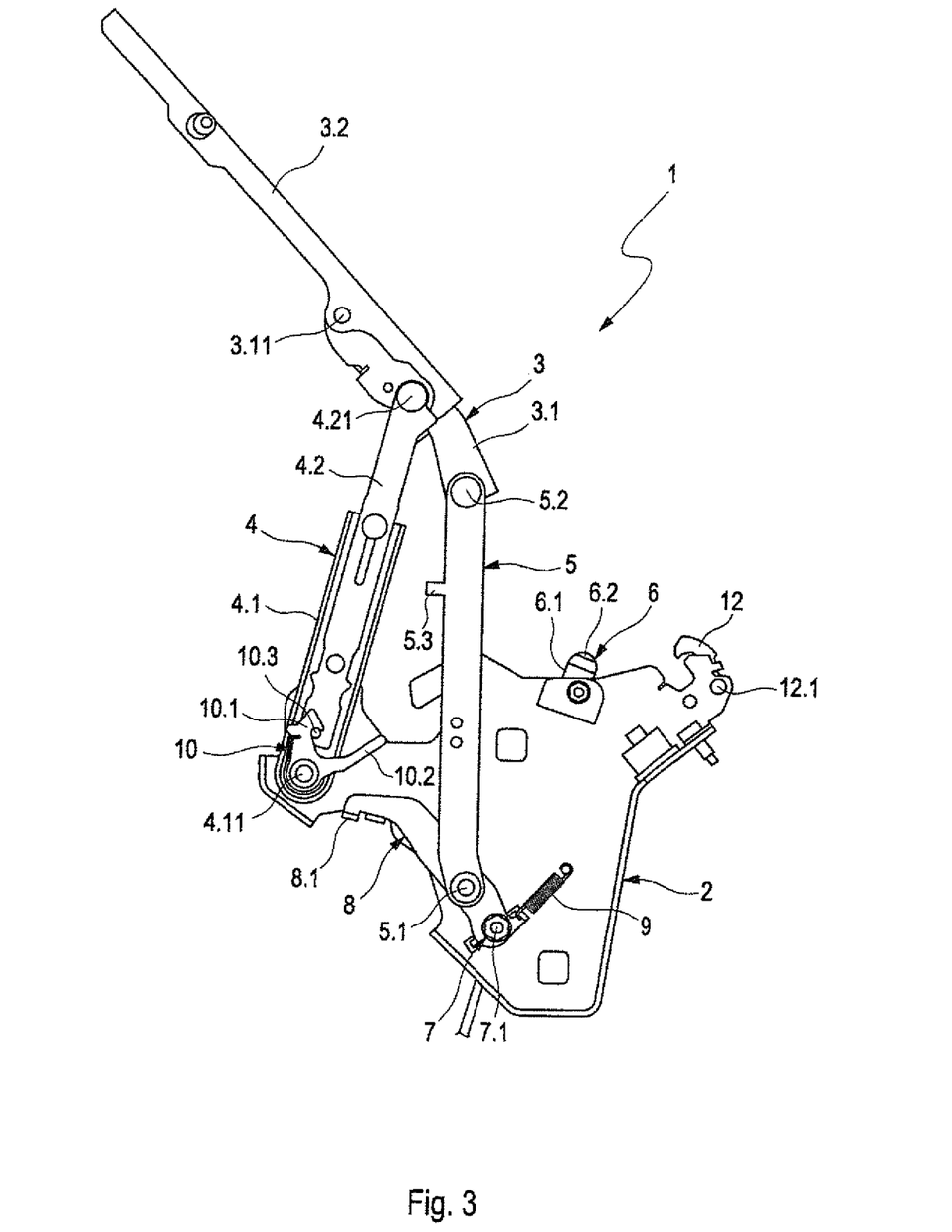

From its closed position shown in FIGS. 1 and 2, the hood hinge 1 is moved to an open position according to FIG. 3 for manually opening the front hood. For this purpose, the two link levers 4 and 5 are pivoted about the pivot axes 4.11, 4.21, 5.1 and 5.2 to the positions shown in FIG. 3, with the telescopic function of the first link lever 4 being locked by means of the locking element 10. Likewise the swinging movement of the upper hinge upper part 3.2 relative to the lower hinge upper part 3.1 still remains locked.

This locking element 10 for the telescopic function of the first link lever 4 is designed as a 2-sided angle lever, with one end of the locking element 10 being configured as a locking hook 10.1 and the other end of the locking element 10 being configured as a coupling arm 10.2, with which a coupling with the release lever 8 is established. In order to lock the telescopic function of the first link lever 4, the second sublever 4.2 of the first link lever 4 has a locking pin 10.3 which is engaged by the locking hook 10.1 of the locking element 10. When the hood hinge 1 is moved from the closed position according to FIGS. 1 and 2 to the open position according to FIG. 3, the telescopic function of the first link lever 4 remains locked, i.e. the locking hook 10.1 embraces the locking pin 10.3.

Figure 4:
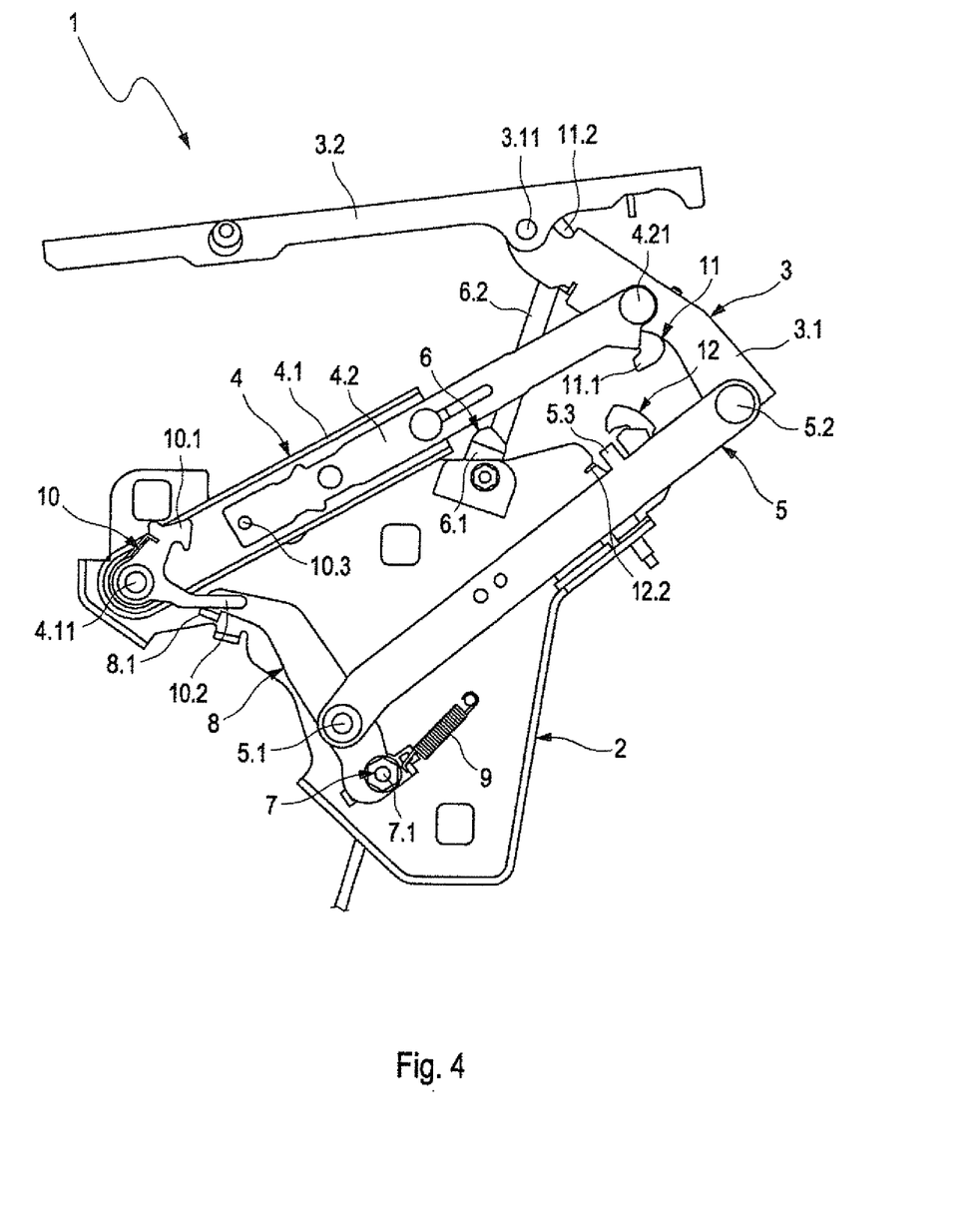
Figure 5:
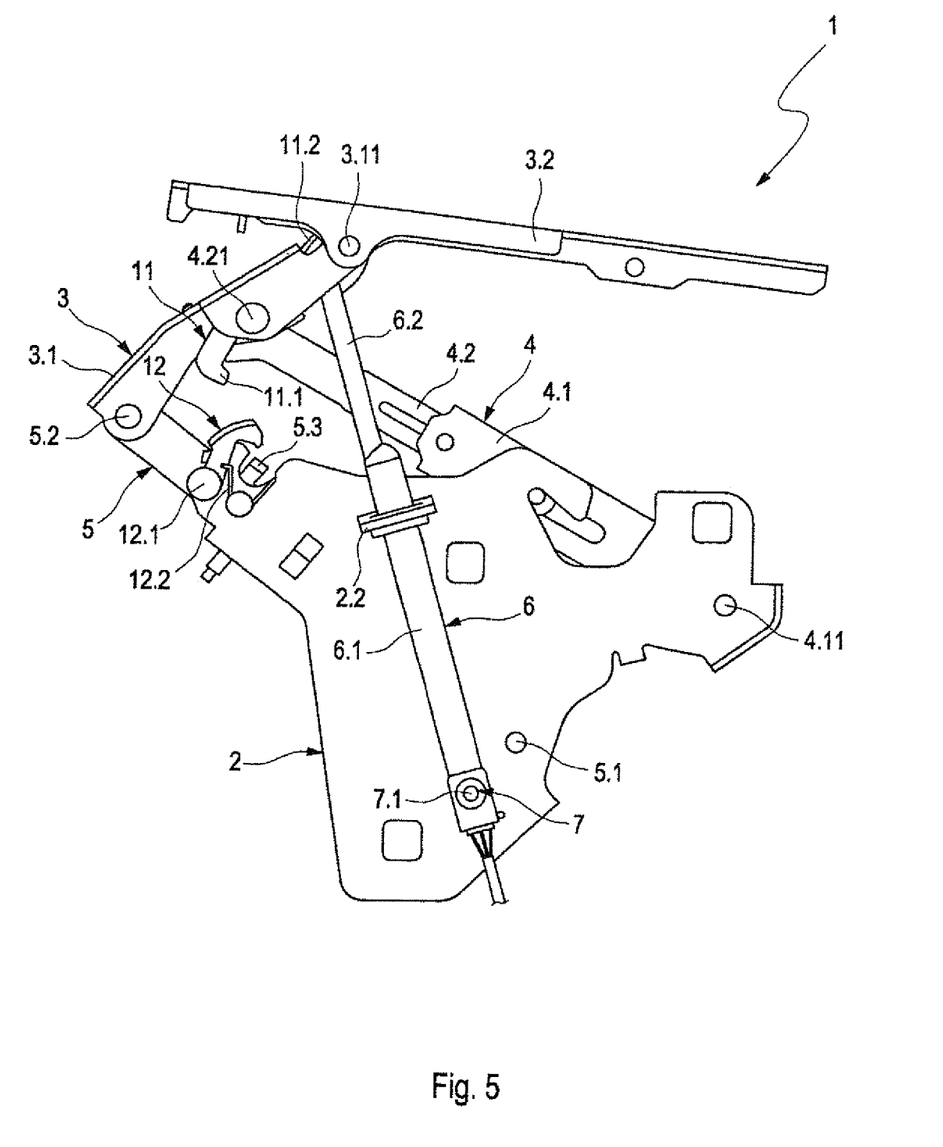

Upon activation of the lifting actuator 6, the hinge upper part 3 is raised to a position according to FIGS. 4 and 5, in which the front hood assumes a pedestrian protection position. FIG. 4 shows the hood hinge 1 in a view upon the two link levers 4 and 5, while FIG. 5 shows the opposite side with a view upon the lifting actuator 6.

For movement of the hood hinge 1 to the position corresponding to the pedestrian protection position of the front hood, the second link lever 5 remains in its position and forms with its pivot axis 5.2 a pivot point with the lower hinge upper part 3.1, while the first link lever 4 telescopes from its position according to FIG. 1 to the position according to FIG. 4, so that a further pivot point is established via the pivot axis 4.21. As a result, a swinging movement of the upper hinge upper part 3.2 is initiated both upwards in the z-direction and in the x-direction in opposition to the direction of travel, so that the front hood reaches the pedestrian protection position.

Figure 7:
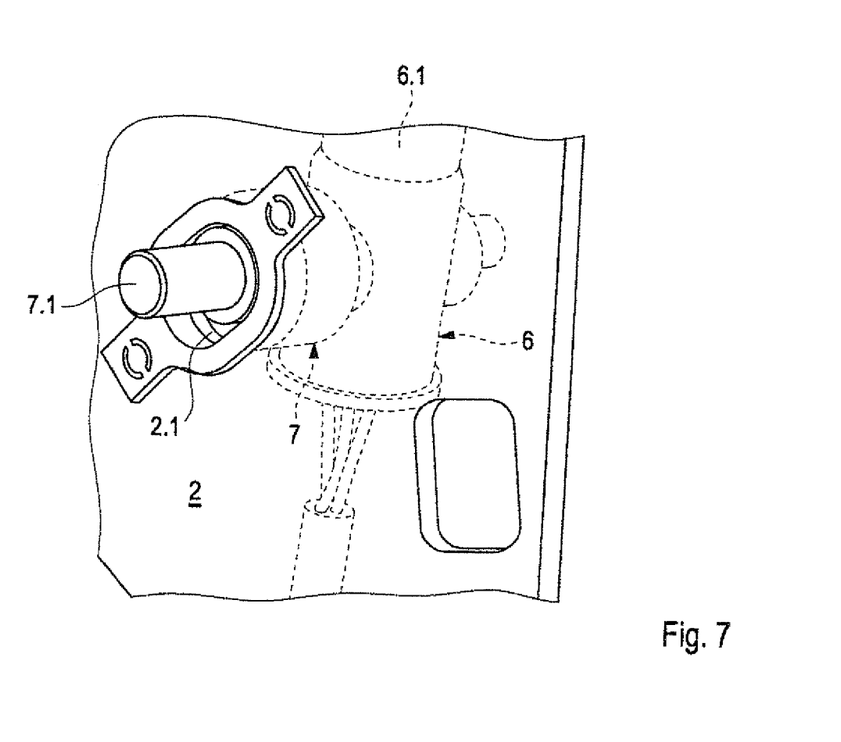

The pyrotechnic lifting actuator 5 includes an actuator housing 6.1 and an actuator tappet 6.2, with the actuator housing 6.1 being connected at the lower end with a bearing element 7 which is embodied as a stepped bolt and which in turn is movably mounted in an oblong hole 2.1 of the hinge lower part 2 (cf. FIG. 7). When being activated, the lifting actuator 6 is transferred from a passive state corresponding to FIGS. 1 and 2 to an active state according to FIGS. 4 and 5, with the lifting actuator 6 having in this active state with respect to its passive state a change in length between the bearing element 7 and the end of the non-extended actuator tappet 6.2. The change in length of the lifting actuator 5 caused by the extension of the actuator tappet 6.2 is used to lift the hinge upper part 3 into the position corresponding to the pedestrian protection position of the front hood.

Figure 6:
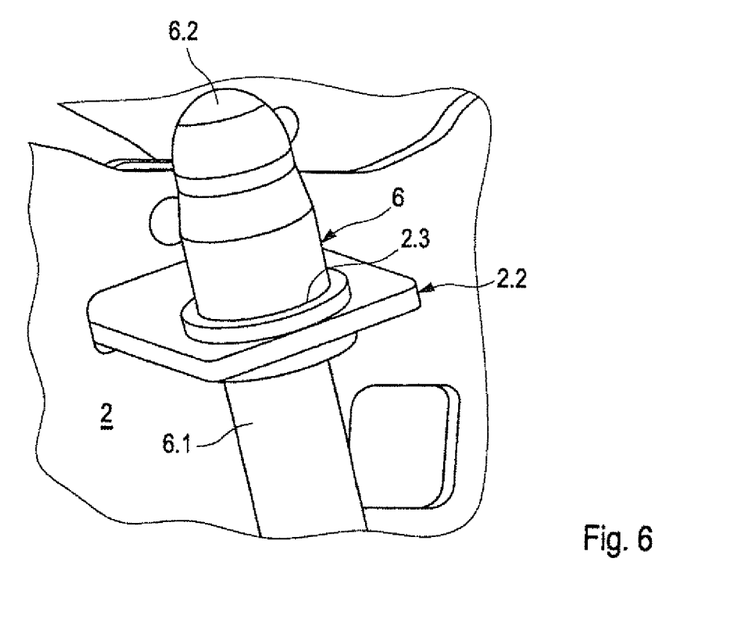

Upon activation of the lifting actuator 5, i.e. ignition of its propellant charge, not only is the actuator tappet 6.2 moved upward in the direction of the hinge upper part 3, but at the same time or by a time delay the lifting actuator 6 is moved downwards as a consequence of the recoil generated with the ignition, since the lower end of actuator housing 6.1 is movably mounted via the bearing element 7 in the oblong hole 2.1 of the hinge lower part 2. The contour of the oblong hole 2.1 determines the direction and the distance of the recoil motion of the lifting actuator 6 during its activation. In order to enable this recoil motion of the lifting actuator 6, the cylindrical actuator housing 6.1 is movably held in a collar hole 2.3 of an actuator holder 2.2 (cf. FIG. 6).

The bearing element 7 is spring-biased in the passive state of the actuator 5 by a spring element 9 and is thereby held in a rest position. As a result of the recoil motion of the lifting actuator 6, the bearing element 7 is moved to an active state in opposition to the spring force of the spring element 9 to the opposite end of the oblong hole 2.1. This movement of the bearing element 7 between its rest position and its active position is transmitted to the release lever 8 which is swingably mounted via the pivot axis 5.1 in the hinge lower part 2, since one end of the release lever 8 is swingably arranged on a pivot axis 7.1 formed by the bearing element 7. The other end of the release lever 8 interacts with the coupling arm 10.2 of the locking element 10 as a consequence of a swinging movement initiated by the bearing element 7, so that the locking pin 10.3 is liberated from the locking hook 10.1 by a corresponding swinging movement of the locking element 10, as this becomes apparent from FIG. 4. When the bearing element 7 moves from its rest position to the active position (cf. FIG. 1), the release lever 8 is pivoted in a rotation direction D1. This causes a rotational movement of the locking element 10 in a rotation direction D2, since the coupling arm 10.2 is engaged by a stop 8.1 formed on the end of the release lever 8. As a result, the recoil motion generated by the activation of the lifting actuator 5 leads to the release of the telescopic function of the first link lever. 4

As already described above, the activation of the lifting actuator 6 is provided not only for releasing the locking element 10, but mainly for lifting the hinge upper part 3 to a position corresponding to the pedestrian protection position. In order to be able to lift the hinge upper part 3 to the position corresponding to the pedestrian protection position of the front hood, the swinging movement between the hinge lower upper part 3.1 and the upper hinge upper part 3.2 must be released by an actuation of the further locking element 11.

This further locking element 11, swingably arranged in the lower hinge upper part 3.1 via the pivot axis 4.21, includes a locking hook 11.1 and a formed-on release arm 11.2. As the lifting actuator 6 is activated, the free end of the actuator tappet 6.2 moving out of the actuator housing 6.1 impacts, after bridging a distance to the release arm 11.2, upon the latter and causes initially a swinging movement that results in the release of the swinging movement of the upper hinge upper part 3.2 relative to the lower hinge upper part 3.1 and subsequently in a lifting of the hinge upper part 3 to the position corresponding to the pedestrian protection position of the front hood as the release arm 11.2 contacts the upper hinge upper part 3.2, with the first link lever 4 being fully extended. The locking element 11 is biased by a spring element (not shown) to seek a position in which the swinging movement of the upper hinge upper part 3.2 is locked to the lower hinge upper part 3.1.

The change in length of the lifting actuator 6 as caused by the activation of the lifting actuator 6 is selected such that in the active position of the bearing element 7, the end of the extended actuator tappet 6.2 is fully lifted to the position corresponding to the pedestrian protection position of the front hood.

The release operation, i.e. the pivoting of the further locking element 11, causes a pivoting of a locking hook 12 swingably mounted in the hinge lower part 2 via a pivot axis 12 to effect a position in which the pivoting of the second link lever 5 is locked, as a locking pin 5.3 formed on the second link lever 5 is embraced by the locking hook 12. This locking of the swinging movement of the second link lever 5 is absent, when the front hood is opened in normal use according to FIG. 3. This locking hook 12 is biased in its non-locking position by a spring element 12.2.

REFERENCE SIGN 1 hood hinge
2 hinge lower part
2.1 oblong hole
2.2 actuator holder
2.3 collar hole of the actuator holder 2.2
3 hinge upper part
3.1 lower hinge upper part
3.2 upper hinge upper part
4 first link lever
4.1 first sublever of the first link lever 4
4.11 pivot axis
4.2 second sublever of the first link lever. 4
4.21 pivot axis
5 second link lever
5.1 pivot axis
5.2 pivot axis
5.3 locking pin
6 lifting actuator
6.1 actuator housing of lifting actuator 6
6.2 actuator tappet of lifting actuator 6
7 bearing element
7.1 pivot axis
8 release device, release lever
8.1 stop of the release device 8
9 spring element
10 locking element
10.1 locking hook
10.2 coupling arm
10.3 locking pin 11 further locking element
11.1 locking hook of the further locking element 11
11.2 release arm of the further locking element 11
12 locking hook
12.1 pivot axis

The invention claimed is:

1. A hood hinge for a front hood of a vehicle, said hood hinge comprising:
a hinge lower part for attachment to a vehicle body;
a bearing element movably mounted in the hinge lower part;
a hinge upper part for attachment to the front hood;
first and second link levers connecting the hinge lower part with the hinge upper part, with the first link lever being constructed telescopically and its telescopic function being lockable;
a lifting actuator connected to the hinge lower part via the bearing element and configured to undergo a change in length in relation to the bearing element between a passive state and an activated active state to raise the hinge upper part, with the bearing element assuming a rest position in the passive state of the lifting actuator and with the bearing element being moved to an active position, when the lifting actuator is activated; and a release device in operative connection with the bearing element for releasing the telescopic function of the first link lever, with the release device being actuated, when the bearing element is moved from the rest position to the active position.

2. The hood hinge of claim 1, wherein the hinge lower part includes an oblong hole, in which the bearing element is movably mounted between the rest position and the active position.

3. The hood hinge of claim 1, further comprising a spring element constructed to bias the bearing element so as to seek the rest position.

4. The hood hinge of claim 1, further comprising a locking element constructed to lock the telescopic function of the first link lever.

5. The hood hinge of claim 4, wherein the release device is constructed as release lever which is swingably arranged in the hinge lower part and which is swingably connected to the bearing element and coupled with the locking element such that the locking element is actuated for releasing the telescopic function of the first link lever, when the bearing element is moved from the rest position to the active position.

6. The hood hinge of claim 5, wherein the locking element is constructed as a locking lever which is swingably mounted in the hinge lower part for locking the telescopic function of the first link lever and for releasing the telescopic function of the first link lever which is coupled to the release lever.

7. The hood hinge of claim 1, further comprising an actuator holder in which the lifting actuator is movably mounted, said actuator holder being arranged on the hinge lower part.

8. The hood hinge of claim 1, wherein the lifting actuator includes an actuator housing and an actuator tappet movable out of the actuator housing into the active state.

9. The hood hinge of claim 8, wherein the actuator housing of the lifting actuator is connected to the bearing element.

10. The hood hinge of claim 1, wherein the lifting actuator is constructed as a pyrotechnic actuator.

11. The hood hinge of claim 1, wherein the hinge upper part includes a lower hinge upper part and an upper hinge upper part which is pivotally connected to the lower hinge upper part, and further comprising a further locking element configured to lock a swinging movement between the upper and lower hinge upper parts, with the change in length of the lifting actuator actuating the further locking element for releasing the swinging movement between the lower hinge part and the hinge upper part.

* * * * *